Sept. 30, 1958     B. A. MACKEY     2,853,904
CORE CUTTER
Filed Nov. 7, 1955     2 Sheets-Sheet 1
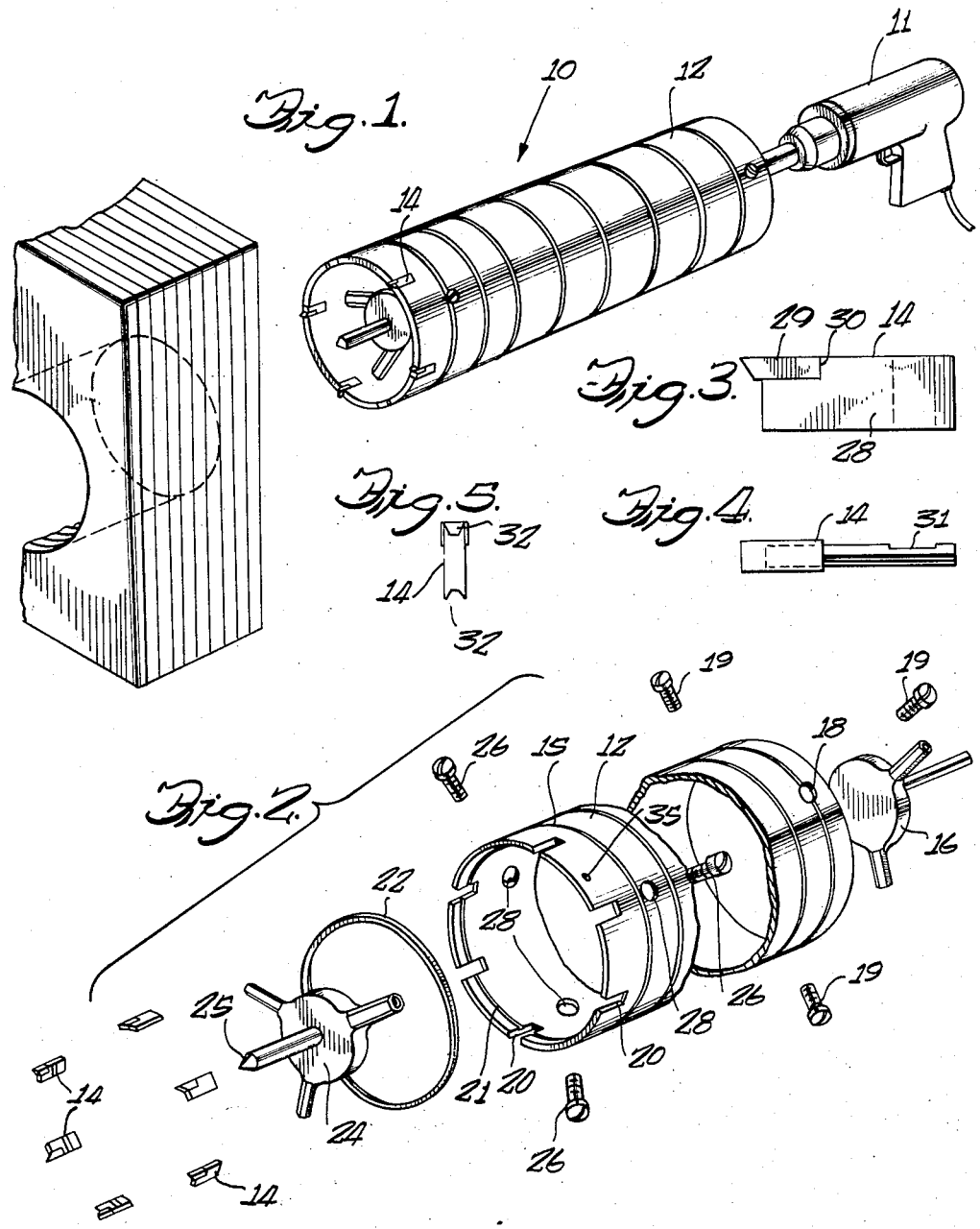

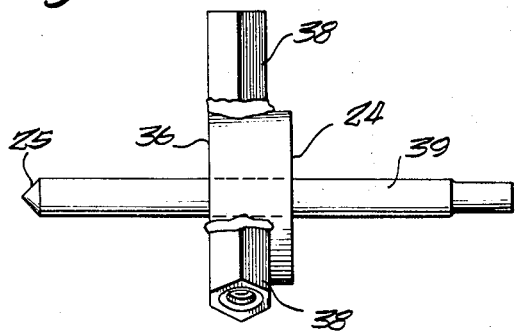
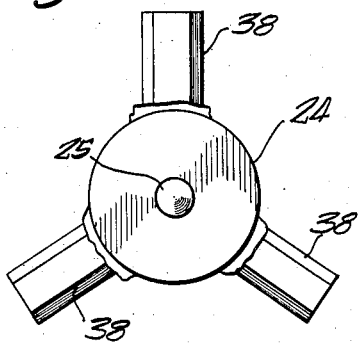
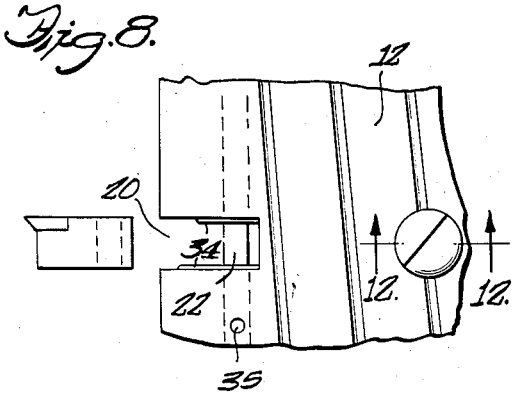
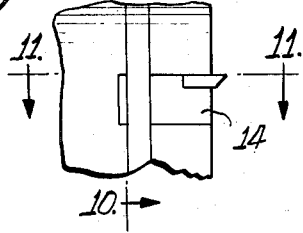
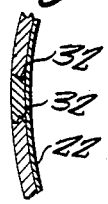
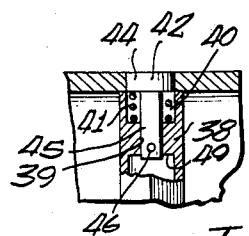
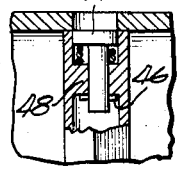

United States Patent Office 2,853,904
Patented Sept. 30, 1958

2,853,904

CORE CUTTER

Bruce A. Mackey, Libertyville, Ill.

Application November 7, 1955, Serial No. 545,277

5 Claims. (Cl. 77—69)

The present invention relates to the general field of boring tools, but more particularly concerns that class of tools intended for cutting cores through a wide variety of materials which relay on a core barrel with peripheral cutting bits on one end.

While boring tools of this general classification are known, they suffer from several disadvantages.

In most instances the core to be cut will run into substantial diameters, ranging from two or three inches upwards to a maximum practicable diameter. As the diameter of the barrel increases, the tool becomes more difficult to center while hand operated. Consequently, a jig is employed to start and center the tool. After the barrel has penetrated the work for a few inches, the cut itself will continue to center and guide the tool. Mounting a jig, however, is time consuming and often scars the surface of the workpiece. A careless operator may not get the jig centered properly, and the bore consequently will not be true.

In addition, after the tool has entered the work to some extent the pressure on one of the peripheral cutting bits can cause them to break. In the conventional boring tools the cutting bits are permanently secured to the barrel. When one bit breaks the tool becomes ineffective. This requires resetting the bit including realignment. Not only is such an operation costly, but it renders the tool inoperable at the working site requiring a second tool to finish the job. Where various size cores are being cut and an adequate reserve of core cutters is to be maintained, a substantial investment in replacement tooling is required.

Accordingly, it is the general object of the present invention to provide a core cutting tool which affords a self-contained unit in which the wearing parts are readily replaceable.

Another object of the invention is to furnish a core cutter with self-centering, thereby eliminating any use of jigs to start the cut.

A further object of the invention is to provide a self-centering core cutter with readily replaceable centering elements and cutting elements permitting the use of the core cutter to cut into a wide variety of materials by replacing the cutting and pilot members on the job. A related object of the invention is to furnish a core cutter with all of its cutting elements susceptible of replacement without the use of any special tools.

Further objects and advantages of the present invention will become apparent as the following specification proceeds, taken in conjunction with the illustrative drawings in which:

Figure 1 is a perspective view of a core cutter illustrative of the present invention shown in operation cutting a plurality of layers of wood while powered by a hand-operated electric drill.

Fig. 2 is an exploded perspective view of the core cutter illustrated in Fig. 1.

Fig. 3 is a front elevational view of a replaceable cutting bit employed with the core cutter.

Fig. 4 is a top view of the core cutter bit shown in Fig. 3.

Fig. 5 is an end view of the core cutter bit shown in Figs. 3 and 4.

Fig. 6 is a side view of the centering spider.

Fig. 7 is an end view of the centering spider shown in Fig. 6.

Fig. 8 is an enlarged broken view of the cutting edge of the core cutter showing the cutter bit removed from the cutter bit mounting slot on the core cutter.

Fig. 9 is an inside broken view in enlarged sections of the cutter bit locked in position in the core cutter.

Fig. 10 is an enlarged broken section showing the relationship between the cutter bit and the core cutter in locked position taken along section 10—10 of Fig. 9.

Fig. 11 is an enlarged broken section showing the relationship between the cutter bit and the core cutter cutting bit mounting slot taken along section 11—11 of Fig. 9.

Fig. 12 is an enlarged broken section of the mount for the centering jig taken along section 12—12 of Fig. 8.

Fig. 13 is an enlarged partial section of a modified form of centering jig mount taken along section 12—12 of Fig. 8 showing the mount in the engaged position.

Fig. 14 shows the modified centering jig mount of Fig. 13 in the disengaged position permitting the centering jig to be removed from the core cutter.

As will be seen from referring to Fig. 1 of the drawings, a core cutter illustrative of the present invention may be employed in cutting a circular hole of substantial diameter and depth. The core cutter 10 is generally powered by a hand-operated electric drill 11 and may be used for cutting through masonry or thick wood sections. One particularly useful application is in existing structures where it is desired to run plumbing or similar pipes through walls or other structural members by first boring a hole therethrough.

Core cutters employing a cylindrical barrel 12 as does the core cutter illustrated (which will be described in greater detail hereinafter) have been proposed and used. Such core cutters, however, suffer from operational disadvantages in that the cutter bits 14 often become worn or broken or otherwise inoperative. Under such circumstances the operator must either continue his cut with one of the cutter bits malfunctioning or inoperative, or he must have an extra core cutter along with him. In addition, it will be appreciated that centering the core cutter for boring a hole is somewhat difficult because of the size and weight of the tool.

In order to render the core cutter 10 more flexible, as well as capable of sustained operation without delays caused by breakdowns, a unique replaceable centering jig is employed along with replaceable cutting bits in a core cutter such as illustrated.

The elements employed to achieve this replaceability are illustrated in Fig. 2, and an exploded view of the core cutter 10. In Fig. 2 it will be seen that the barrel 12 has a peripheral spiraled groove 15 which assists in the removal of the chips and cuttings. The barrel 12 is driven to the rear portion by a drive spider 16 secured in holes 18 at the rear portion of the barrel by means of a drive spider mounting screw 19.

At its opposite end the barrel 12 has a plurality of cutter bit mounting slots 20 which receive the cutter bits 14. A unique inner channel 21 is employed at the end of the cutter barrel 12. It will be noted that the inner channel 21 overlaps the cutter bit slots 20 to receive the cutter bit snap ring lock 22. The snap ring lock 22 holds the replaceable cutter bits 14 in place during operation. The centering jig is in the form of a replaceable spider 24 having a boring portion 25. The spider is held in place within the cutting end of the cutter barrel 12 by means of centering jig mounting screws 26 which pierce the centering jig mounting holes 28 in the core cutter barrel.

The details of the cutter bits are shown in Figs. 3, 4 and 5. There it will be seen that the cutter bit 14 contemplates a body portion 28 and a normally hardened steel or carbide tip 29 which may be brazed to it through notch 30 of the cutter bit body 28. A lateral channel 31 is provided across the cutter bit body 28 at the opposite end of the cutting tip 29 proportioned to matingly engage the cutter bit locking snap ring 22. Although the cutting tip 29 illustrated has a sharp relief angle and is slightly wider than the cutter bit, a wide variety of cutting tips are contemplated depending upon the material intended for cutting. Referring now to Fig. 5, it will be seen that the longitudinal edges of the cutting bit are provided with V-shaped grooves 32 which engage mating surfaces in the cutter bit mounting slots 20.

To mount the cutter bits 11 a mating slot 20 with V-shaped edges has been provided along the edges of the cutter barrel. Referring now to Figs. 8, 9, 10 and 11, it will be seen that the cutting bit slot has a pair of V-shaped ridges 34 proportioned to meet with the V-shaped slots 32 of the cutter bit. After the cutter bit, shown in its disengaged relationship in Fig. 8, is slipped into place so that the mating ridges in grooves 32, 34 engage each other, the snap ring 22 is then locked in place and engages the snap ring channel 31 of the cutter bit 14 as best illustrated in Figs. 9 and 11. A snap ring removal hole 35 is provided at conveniently located stations along the periphery of the barrel 12 overlapping the snap ring mounting channel 31 within the cutter barrel 12.

When the operator wishes to replace one of the cutter bits 14 he inserts either a nail, pencil, or other convenient point into the release hole which deflects the snap ring 22 so that his finger may be engaged behind the deflected portion of the snap ring thereby releasing the particular cutter bit which is to be replaced. If all of the cutter bits 14 are to be replaced, then the snap ring may be removed completely and the other cutter bits installed and the snap ring subsequently slipped in place in the locking groove.

The centering of the core cutter is accomplished through the use of a unique removable center jig. The centering jig 24 is illustrated in detail in Figs. 6 and 7. It will be seen that the jig comprises a circular body portion 36, to which three legs 38 have been fastened to form a spider. A central shaft 39 runs through the body 36 along the rotational axis of the spider and terminates at its end with a cutting tip 25.

In the present instance the cutter tip 25 has been shown as one intended for use with masonry structures, but an auger or other wood boring tip may be employed in accordance with the most effective type tip determined for the matter intended to be cut. The rear portion of the circular shaft 39 of the centering jig 24 may contain an additional cutter point 25, or may be adapted to serve as a driving spider 16 depending upon its location within the bore of the cutter barrel housing 12. In the present instance the legs 38 of the spider have been bored and threaded to receive mounting screws 26 proportioned to mount flush against the surface of the cutter barrel 12 as illustrated in Fig. 12.

A modified form of centering jig mounting mechanism is shown in Figs. 13 and 14. There it will be seen that the leg 38 of the spider has been provided with a circular bore 39 with an upper recessed spring retaining chamber 40. A spring 41 is mounted within the chamber. The mounting bolt 42 has a button head 44 on a shaft 45, the end of the shaft being pierced with a cross pin 46. The cross pin 46 slides within lateral slots 48 when the button head 44 is depressed. After reaching sufficient depth, such as shown in Fig. 14, the button head is then depressed and the cross pin 42 engages the shoulder 49 within the leg, holding the button head 44 in the retracted position so that the centering jig may be removed from inside the cutter barrel 12. A convenient slot engageable by a screw driver or coin may be provided in the top of the button 44 in the modified centering jig mounting construction.

The combined action of the unique features of the core cutter 10 hereinafter will be more fully appreciated as an operational cycle is followed. The operator begins his cut by first selecting the appropriate cutter bit 14 and center jig cutter 25 for the work piece involved. The electric drill is removably coupled to the rear end of the drive spider 16 and the core cutter assembly 10, moved against the work piece until the spider jig cutter point 25 engages the center of the hole to be cut. The electric drill is then actuated and the cutter bit 25 of the centering jig 24 begins to bore a pilot hole. As the pilot hole progresses the cutting tip of the cutter bits 14 will begin to engage the surface of the work piece. As cutting continues cutter bits 14 will bite further into the work piece until the barrel has penetrated into the work to a depth approximating the length of the cutter bit. At this point the core cutter 10 is removed from the work, and the centering jig removed from within the core cutter barrel 12. The core cutter is then reinserted in the circular slot which was cut while the pilot hole was being bored and the driving means started again. The operator then continues to bear down on the core cutter 10 until he completes the cut.

Often in operation, particularly where cutting through masonry, when buried nails and the like may be encountered, the cutter tip 29 of the cutter bit 14 may become dulled or broken. This naturally reduces the efficiency of the cutting tool.

When the operator senses that the cut is not progressing as rapidly as warranted by the material, he may remove the core cutter and inspect the cutter bits. Upon noticing that one or more of the cutter bits require replacing, he need only grab a nail or small pointed tool and insert it into the snap ring dismounting hole 35 and release the snap ring 22 and remove the cutter bits 14 from the cutter bit mounting slots 20 and replace the worn bits with a new bit. When going from one type of material to another, all of the cutter bits may be replaced, and different centering spiders with their accompanying cutter points may be employed. In the present instance six cutter bits 14 have been shown, but as many or as few as may be required by the work piece being cut may be employed.

Although a particular embodiment of the invention has been shown and described in full here, there is no intention to thereby limit the invention to the details of such embodiment. On the contrary, the intention is to cover all modifications, alternative embodiments, usages and equivalents of the core cutter as fall within the spirit and scope of the invention, specification and appended claims.

I claim as my invention:

1. A core cutter comprising, in combination, a core barrel, means secured to the barrel for coupling to a rotary dive, cutting bits removably secured within notches on the periphery of the barrel, each of the bits having a transverse channel on its interior face, means defining an interior circumferential channel in the core barrel oriented to join the bit channels when the bits are positioned in the barrel notches, means for securing the bits in place against axial movement including an internal snap ring proportioned to engage the interior faces of the cutter bits and the interior circumferential channel in the core barrel, and a centering element characterized by a spider for engaging the barrel, a shaft extending from the spider coaxially with the barrel, and a point on the end of the shaft tipped with a cutting element adapted for the same material as the cutting bits.

2. In a core cutter having an elongate core barrel with peripheral cutting bits, a replaceable cutter bit assembly comprising, in combination, means defining mounting slots along the periphery of the core barrel, means along the edges of the cutter bits proportioned to mate with the cutter bit slots to lock the bits against radial movement, each of the bits having a transverse channel on its back portion, means defining an inner peripheral channel in the cutter barrel proportioned to join the cutter bit channels, and an interior snap ring proportioned to nest within the barrel and cutter bit channels thereby removably securing the cutter bits in place against axial movement.

3. A core cutter comprising, in combination, a core barrel having mounting slots along the periphery, said slots having V-shaped longitudinal ridges, cutting bits mountable in the slots and having V-shaped longitudinal recesses shaped to mate with said ridges to lock the bits against radial movement, means for removably locking the cutting bits against longitudinal movement including an interior snap ring, and a removable centering jig characterized by a center bit on a shaft extending coaxially with the barrel beyond the barrel cutter bits.

4. In a core cutter having an elongated core barrel with a plurality of peripheral cutting bits, a replaceable cutter bit assembly comprising, in combination, means defining cutting bit mounting slots along the periphery of the core barrel, means defining a channel across the back of the cutter bit, means defining an inner peripheral channel in the cutter barrel proportioned to join the cutter bit channels, and a snap ring proportioned to nest within the barrel and cutter bit channel thereby removably securing the cutter bits in place against longitudinal movement, said core barrel being provided with a hole extending therethrough into said channel to permit the insertion of a tool for depressing said snap ring sufficiently to permit removal of a single cutter bit or removal of the snap ring.

5. For use with a core cutter having an elongate barrel with a plurality of cutting bits along one end of the barrel, a centering jig characterized by a spider body with legs extending to the inner wall of the core barrel, a shaft extending from the spider body oriented coaxially with the core barrel, a cutting bit on the end of the shaft, said spider legs having radial bolt receiving recesses at their outer ends adjacent said core barrel, said core barrel having bolt holes oriented to mate with the bolt receiving recesses of the spider legs, and bolts removably insertable through said opening into said recesses to lock said spider in place within the core barrel.

References Cited in the file of this patent

UNITED STATES PATENTS

| 505,963 | Smith | Oct. 3, 1893 |
| 1,062,342 | MacConnell | May 20, 1913 |
| 2,794,469 | Shortell | June 4, 1957 |

FOREIGN PATENTS

| 5,302 | Great Britain | 1914 |
| 81,021 | Sweden | July 24, 1934 |